(12) United States Patent
We et al.

(10) Patent No.: US 11,989,053 B2
(45) Date of Patent: *May 21, 2024

(54) DISPLAY DEVICE

(71) Applicant: SAMSUNG DISPLAY CO., LTD., Yongin-si (KR)

(72) Inventors: Sung-Wook We, Asan-si (KR); Hye-Sung Kim, Bucheon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,630

(22) Filed: Sep. 7, 2021

(65) Prior Publication Data

US 2021/0405690 A1  Dec. 30, 2021

Related U.S. Application Data

(63) Continuation of application No. 16/732,989, filed on Jan. 2, 2020, now Pat. No. 11,126,222.

(30) Foreign Application Priority Data

Jan. 18, 2019  (KR) ........................ 10-2019-0006682

(51) Int. Cl.
*G06K 9/00* (2022.01)
*G02B 1/14* (2015.01)
*G06F 1/16* (2006.01)
*G06V 40/13* (2022.01)

(52) U.S. Cl.
CPC ............. *G06F 1/1609* (2013.01); *G02B 1/14* (2015.01); *G06F 1/1684* (2013.01); *G06V 40/1306* (2022.01); *G06V 40/1318* (2022.01); *G06V 40/1329* (2022.01)

(58) Field of Classification Search
CPC .... G06F 1/1609; G02B 1/14; G06V 40/1318; G06V 40/1329; G06V 40/1306; G02F 1/1684; H04M 1/0266
See application file for complete search history.

(56) References Cited

U.S. PATENT DOCUMENTS

| 10,366,272 B2 | 7/2019 | Song et al. |
| 10,489,629 B1 | 11/2019 | Jiang et al. |
| 10,599,998 B2 | 3/2020 | Jung et al. |
| 10,741,621 B2 | 8/2020 | Choo et al. |

(Continued)

FOREIGN PATENT DOCUMENTS

| CN | 105094227 | 11/2015 |
| CN | 204926035 | 12/2015 |

(Continued)

*Primary Examiner* — Abdul-Samad A Adediran
(74) *Attorney, Agent, or Firm* — F. CHAU & ASSOCIATES, LLC

(57) ABSTRACT

A display device includes a display panel that has a display region in which an image is displayed, a first adhesive layer disposed below the display panel, a translucent protective film disposed below the first adhesive layer, a fingerprint sensor disposed below the protective film and that overlaps the display region, the first adhesive layer, and the protective film when viewed in a plane, and a cover layer disposed below the protective film and in which an opening for accommodating the fingerprint sensor is formed.

19 Claims, 13 Drawing Sheets

(56) References Cited

U.S. PATENT DOCUMENTS

| | | |
|---|---|---|
| 2017/0300738 A1 | 10/2017 | Song et al. |
| 2018/0072166 A1 | 3/2018 | Percebon et al. |
| 2018/0121703 A1 | 5/2018 | Jung et al. |
| 2018/0151641 A1* | 5/2018 | Choo .................. H04M 1/0266 |
| 2018/0151841 A1 | 5/2018 | Choo et al. |
| 2018/0161641 A1 | 5/2018 | Choo et al. |
| 2018/0160545 A1 | 6/2018 | Kim et al. |
| 2018/0373913 A1 | 12/2018 | Panchawagh et al. |
| 2019/0087630 A1* | 3/2019 | Seo .................... G06V 40/1306 |
| 2020/0233458 A1 | 7/2020 | We et al. |

FOREIGN PATENT DOCUMENTS

| | | |
|---|---|---|
| CN | 107306411 | 10/2017 |
| CN | 108021360 | 5/2018 |
| CN | 108109523 | 7/2018 |
| CN | 108323207 | 7/2018 |
| KR | 10-2018-6005995 | 1/2018 |
| KR | 10-2018-0046788 | 5/2018 |
| KR | 10-2018-0059720 | 6/2018 |

* cited by examiner

DISPLAY DEVICE

CROSS-REFERENCE TO RELATED APPLICATION

This U.S. non-provisional patent application is a continuation of U.S. application Ser. No. 16/732,989, filed on Jan. 2, 2020 in the U.S. Patent and Trademark Office, which claims priority under 35 § 119 from Korean Patent Application No. 10-2019-0006682, filed on Jan. 18, 2019 in the Korean intellectual Property Office, the contents of both of which are herein incorporated by reference in their entireties.

BACKGROUND

Technical Field

Embodiments of present disclosure herein are directed to a display device, and more particularly, to a display device that includes a fingerprint sensor.

Discussion of the Related Art

A display device provides a variety of functions by which the display device may organically communicate with a user, such as displaying an image so as to provide information to the user, and detecting the user's input. Recent display devices include a function for detecting a user's fingerprint. Examples of a fingerprint sensing method include a capacitive method that senses a change in capacitance formed between electrodes, an optical method that uses an optical sensor to sense incident light, and an ultrasonic method that uses a piezoelectric body, etc., to sense vibration. For recent display devices, a fingerprint sensor that detects fingerprints can be disposed and assembled on the rear surface of a display panel.

SUMMARY

Embodiments of the present disclosure can provide a display device that has an improved display characteristic.

An embodiment of the inventive concept provides a display device that includes a display panel that includes a display region in which an image is displayed, a first adhesive layer disposed below the display panel, a protective film disposed below the first adhesive layer acid that is translucent, a fingerprint sensor disposed below the protective film and that overlaps the display region, the first adhesive layer, and the protective film when viewed in a plane, and a cover layer disposed below the protective film and in which an opening that accommodates the fingerprint sensor is formed.

In an embodiment, each of the first adhesive layer and the protective film ma overlap the entirety of the display region when viewed in the plane.

In an embodiment, the display device may further include a second adhesive layer disposed below the protective film and that overlaps the entirety of the display region when viewed in the plane, where the second adhesive layer bonds the protective film and the cover layer.

In an embodiment, the display device may further include an adhesive member disposed in the opening between the fingerprint sensor and the second adhesive layer.

In an embodiment, the adhesive member may be opaque or translucent.

In an embodiment, the cover layer may include a first cover layer attached to the second adhesive layer and that includes an undulating surface, a second cover layer disposed below the first cover layer, and a third cover layer disposed below the second cover layer.

In an embodiment, the second cover layer may be a cushion layer and the third cover layer may be a heat dissipation layer.

In an embodiment, at least one of the first adhesive layer or the second adhesive layer may be translucent.

In an embodiment, the display device may further include a light absorbing member disposed below the cover layer and that covers the opening, where the light absorbing member may overlap the entirety of the opening and a portion of the display region when viewed in the plane.

In an embodiment, the display device may further include a light absorbing member disposed below the cover layer and that covers the opening where the light absorbing member may overlap the entirety of the opening and the entirety of the display region when viewed in the plane.

In an embodiment, the protective film may include a colored film.

In an embodiment, the protective film may include a base film and a colored layer disposed on the base film.

In an embodiment of the inventive concept, a display device includes a first adhesive layer, a protective film disposed below the first adhesive layer and that is translucent, a second adhesive layer disposed below the protective film, a cover layer disposed below the protective film and that includes an opening, where the second adhesive layer bonds the protective film and the cover layer, and a fingerprint sensor disposed below the protective film and that is accommodated in the opening of the cover film.

In an embodiment, display device may further include a display panel disposed on the first adhesive layer and that includes a display region in which an image is displayed, where each of the first adhesive layer, the protective film, and the second adhesive layer may overlap the entirety of the display region when viewed in the plane.

In an embodiment of the inventive concept, a display device includes a display panel that includes a display region in which an image is displayed, a first adhesive layer disposed below the display panel and that overlaps the entirety of the display region when viewed in a plane, a protective film disposed below the first adhesive layer, a fingerprint sensor disposed below the protective film that overlaps the display region, the first adhesive layer, and the protective film when viewed in the plane, a cover layer disposed below the protective film and in which an opening for accommodating the fingerprint sensor is formed, and an adhesive member accommodated in the opening and disposed between the fingerprint sensor and the protective film, wherein at least one of the adhesive member or the protective film is translucent or opaque.

In an embodiment, the display device may further include a second adhesive layer disposed between the protective film and the cover layer, and between the protective film and the adhesive member, wherein each of the protective film and the second adhesive layer overlaps the entirety of the display region when viewed in the plane.

In an embodiment, at least one of the first adhesive layer or the second adhesive layer may be translucent.

In an embodiment, the protective film may include a translucent colored film.

In an embodiment, the adhesive member may be opaque and overlap the entirety of the opening when viewed in the plane.

In an embodiment, the cover layer may include a first cover layer attached to the second adhesive layer and that includes an undulating surface, a second cover layer disposed below the first cover layer, and a third cover layer disposed below the second cover layer, where the second cover layer may be a cushion layer and the third cover layer may be a heat dissipation layer.

DETAILED DESCRIPTION

Figure 1:
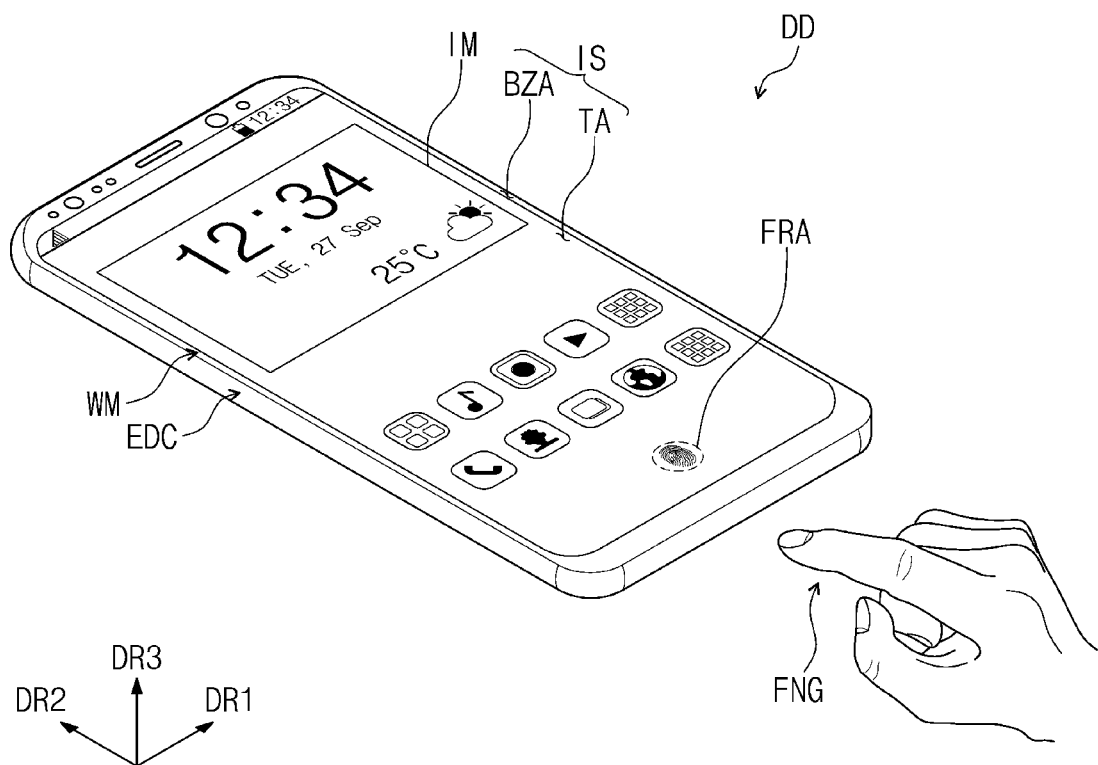
FIG. 1 is a perspective view of a display device according to an embodiment of the inventive concept.

It will be understood that when an element or layer is referred to as being "on", "connected to" or "coupled to" another element or layer, it may be directly on, connected or coupled to the other element or layer, or intervening elements or layers may be present.

Like reference numerals may refer to like elements throughout this specification. In the figures, the thicknesses, ratios and dimensions of elements may be exaggerated for effective description of the technical contents.

Hereinafter, embodiments of the present disclosure will be explanted in detail with reference to the accompanying drawings.

Figure 2:
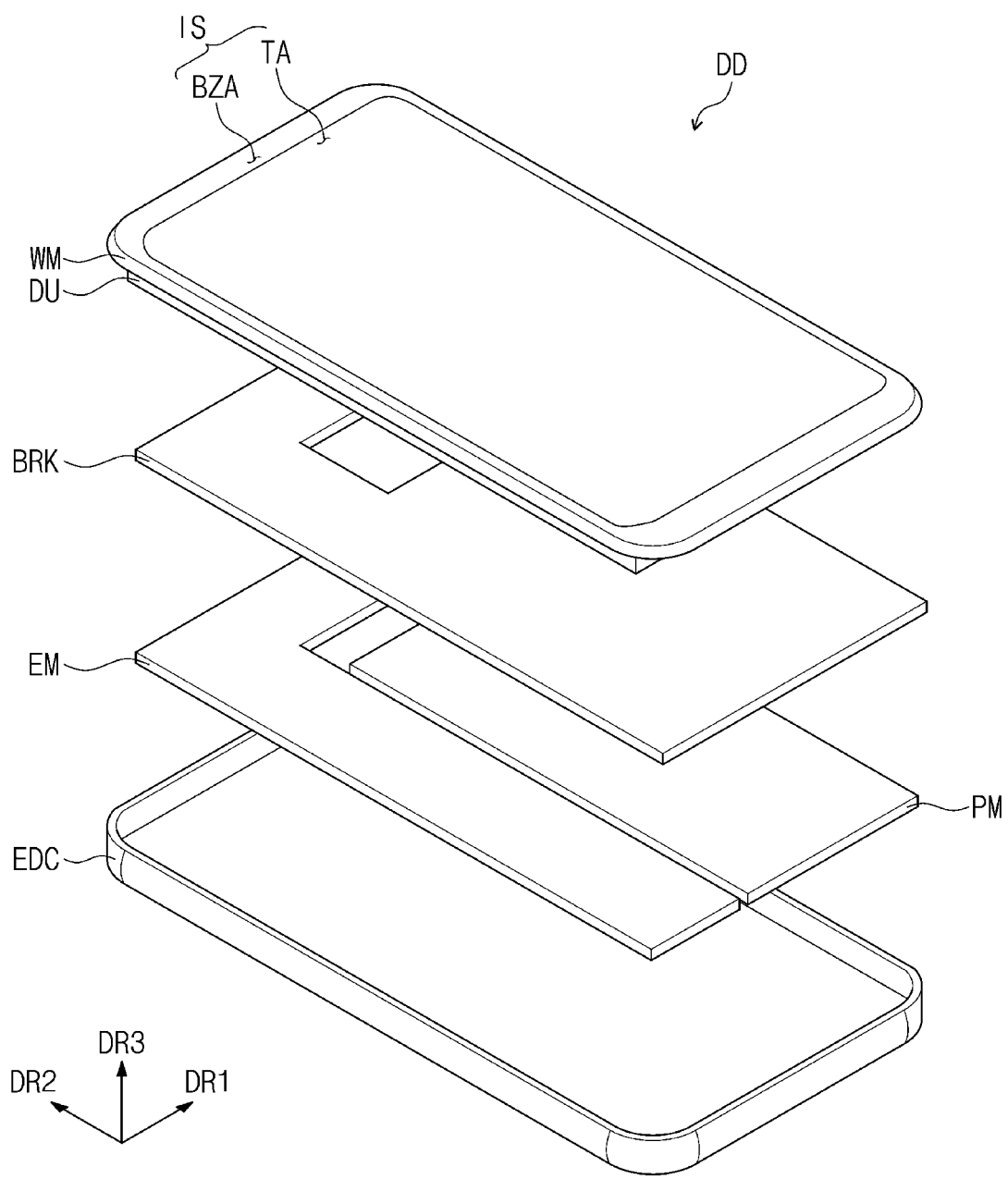
FIG. 2 is an exploded perspective view of a display device illustrated in FIG. 1.

FIG. 1 is a perspective view of a display device according to an embodiment of the inventive concept. FIG. 2 is an exploded perspective view of a display device illustrated in FIG. 1.

Referring to FIGS. 1 and 2, according to an embodiment, a display device DD is activated according to an electrical signal. The display device DD can include various embodiments. For example, the display device DD can be used for a large-sized electronic device such as a television, a monitor, or an outdoor digital sign, or a medium to small-sized electronic device such as a personal computer, a laptop computer, a personal digital assistant, a car navigation device, a game machine, a portable electronic device, or a camera. These are merely exemplary embodiments, and it goes without saying that the display device DD may also be used in other electronic devices as long as the other electronic devices do not deviate from the inventive concept. In this embodiment, the display device DD is illustrated as that of a smartphone by way of example.

According to an embodiment, the display device DD displays an image IM in third direction DR3 on a display surface IS parallel to each of a first direction DR1 and a second direction DR2. The display surface IS on which the image IM is displayed can correspond to a front surface of the display device DD, or to a front surface of a window WM. Hereinafter, the display surface IS, a front surface IS of the display device DD, and a front surface IS of the window WM may all be the same surface. The image IM may include a still image in addition to a dynamic image. A watch window and icons are illustrated in FIG. 1 as an example of the image IM.

In this embodiment, a front or top surface and a rear or bottom surface of each member are defined on the basis of a direction in which the image IM is displayed. The front surface and the rear surface may face each other in the third direction DR3, and a normal direction of each of the front surface and the rear surface may be parallel to the third direction DR3. However, directions indicated by the first to third directions DR1 to DR3 are relative, and may be transformed into other directions.

According to an embodiment, the front surface of the display device DD is divided into a transmissive region TA and a bezel region BZA. The front surface of the display device DD corresponds to the front surface IS of the window WM. Hereinafter, the front surface of the display device DD and the front surface IS of the window WM are described with the same reference numeral.

According to an embodiment, the transmissive region TA is where the image IM displayed. A user views the image IM through the transmissive region TA. In this embodiment, the transmissive region TA has a rectangular shape with rounded vertices. However, embodiments are not limited thereto, and the transmissive region TA may have various other shapes in other embodiments.

According to an embodiment, the bezel region BZA is adjacent to the transmissive region TA. The bezel region BZA has a predetermined color. The bezel region BZA surrounds the transmissive region TA. Accordingly, the shape of the transmissive region TA substantially corresponds to the shape of the bezel region BZA. However, embodiments are not limited thereto, and in other embodiments, the bezel region BZA may be disposed adjacent to only one side of the transmissive region TA or be omitted.

According to an embodiment, the display device DD can detect an externally applied user fingerprint FNG. A fingerprint detection region FRA is provided in the display surface IS of the display device DD. In this embodiment, the fingerprint detection region FRA is provided in the transmissive region TA in which the image IM displayed. However, embodiments are not limited thereto, and in other embodiments, the fingerprint detection region FRA may be provided in the bezel region BZA, the entirety of the transmissive region TA, or the entirety of the front surface IS. The display device DD detects the fingerprint FNG in the fingerprint detection region FRA.

According to an embodiment, the user's fingerprint FNG has characteristics similar to the user's hand, such as surface uniformity and surface curvature. However, the display device DD can also detect surface information of an inanimate object when an input of the inanimate object is received by the display device DD.

According to an embodiment, the display device DD includes the window WM, a display unit DU, an electronic module EM, a power supply module PM, a bracket BRK, and an outer case EDC. The components described above are schematically illustrated in FIG. 2.

According to an embodiment, the window WM determined an appearance of the display device DD. The window WM protects internal components of the display device DD from external impacts and substantially provides the display surface IS of the display device DD.

According to an embodiment, the display unit DU is disposed on a rear surface of the window WM. A description of the display unit DU will be given in detail with reference to FIG. 3.

According to an embodiment, the display unit DU is electrically connected to the electronic module EM via a flexible circuit board. The display unit DU receives information about an image IM to be displayed from the electronic module EM, or provides a user with information processed on the basis of detected fingerprint FNG information provided to the electronic module EM by the display unit DU.

According to an embodiment, the power supply module PM supplies power needed for overall operations of the display device DD. The power supply module PM includes a typical battery module.

According to an embodiment, the bracket BRK divides an internal space of the display device DD. The bracket BRK provides a space in which other components can be disposed. The bracket BRK includes a metallic or a plastic member. A single bracket BRK is exemplarily illustrated in FIG. 2, but embodiments are not limited thereto, and the display device DD may include a plurality of brackets BRK in other embodiments.

In an embodiment, the outer case EDC together with the window WM determines the appearance of the display device DD. Although an outer case EDC compared of one body is illustrated by way of example, embodiments are not limited thereto, and the outer case EDC may include a plurality of bodies assembled with each other in other embodiments. The outer case EDC may include a plurality of frames and/or plates constituted of glass, plastic, or metal.

According to an embodiment, the electronic module EM is mounted on a motherboard, and includes a variety of functional modules that operate the display device DD. The motherboard includes a rigid printed circuit board. The electronic module EM may be one of a control module, a wireless communication module, an image input module, a sound input module, a sound output module, memory, an external interface, a light emitting module, a light receiving module, a camera module, or etc. Some of the functional modules described above are not mounted on the motherboard, but are electrically connected to the motherboard through a flexible circuit board.

Figure 3:
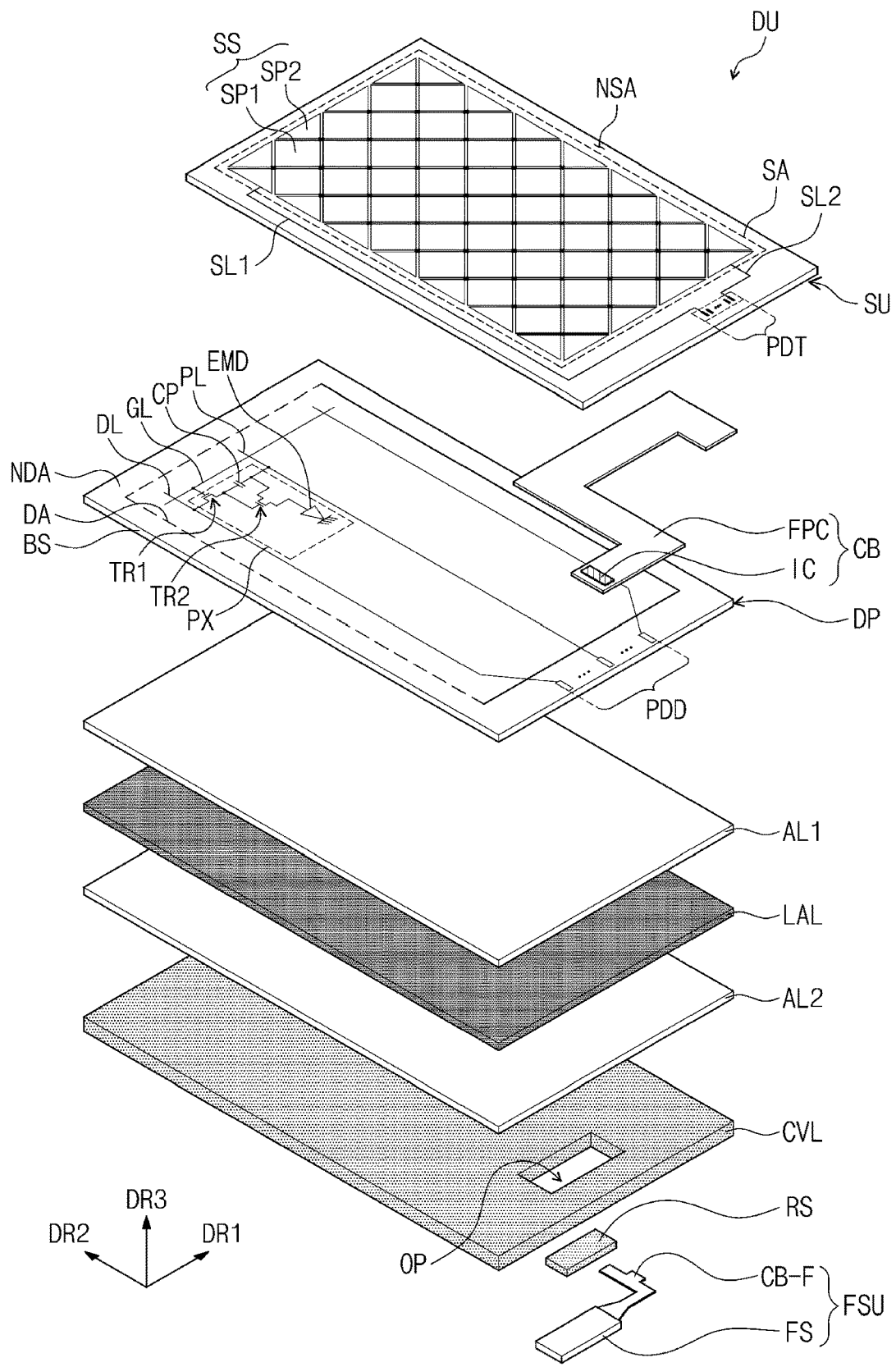
FIG. 3 is an exploded perspective view of some of components illustrated in FIG. 2.

FIG. 3 is an exploded perspective view of some of the components illustrated in FIG. 2.

Referring to FIG. 3, according to an embodiment, the display unit DU includes a sensing unit SU, a display panel DP, a circuit board CB, a first adhesive layer AL1, a protective film LAL, a second adhesive layer AL2, a cover layer CVL, a fingerprint detecting unit FSU, and an adhesive member RS.

According to an embodiment, the sensing unit SU detects an external input and obtains position or intensity information of the external input. The external input can take various forms. For example, the external input can be a touch of a part of a user's body, light, heat, or pressure. The sensing unit SU can also detect an input close to or adjacent to the window WM as well as an input that contacts the window WM (see FIG. 2).

According to an embodiment, sensing unit SU includes a sensing region SA and a non-sensing region NSA. The sensing region SA overlaps the transmissive region TA (see FIG. 2). The non-sensing region NSA is adjacent to the sensing region SA. The non-sensing region NSA surrounds the edge of the sensing region SA. However, embodiments are not limited thereto. The non-sensing region NSA may be adjacent to only a portion of the edge of the sensing region SA or be omitted, and is not limited to any one embodiment.

According to an embodiment, a sensing electrode SS is disposed in the sensing region SA. The sensing electrode SS includes a first sensing electrode SP1 and a second sensing electrode SP2 that receive or transmit different electrical signals. The sensing electrode SS obtains information about an external input by a change in capacitance between the first sensing electrode SP1 and the second sensing electrode SP2.

According to an embodiment, the first sensing electrode SP1 extends in the first direction DR1. The first sensing electrode SP1 includes a plurality of conductive patterns connected to each other in the first direction DR1. There are a plurality of first sensing electrodes SP1 that are spaced apart from each other in the second direction DR2.

According to an embodiment, the second sensing electrode SP2 extends in the second direction DR2. The second sensing electrode SP2 includes a plurality of conductive patterns connected to each other in the second direction DR2. There are a plurality of second sensing electrodes SP2 that are spaced apart from each other in the first direction DR1.

According to an embodiment, sensing lines SL1 and SL2 and sensing pads PDT are disposed in the non-sensing region NSA. The sensing pads PDT are respectively connected to the sensing lines SL1 and SL2 in a one-to-one correspondence. The sensing lines SL1 and SL2 include a first sensing line SL1 and a second sensing line SL2. The first sensing line SL1 is connected to the first sensing electrode SP1 and the second sensing line SL2 is connected to the second sensing electrode SP2.

According to an embodiment, the display panel DP includes a base layer BS, a plurality of signal lines GL, DL, and PL, a plurality of pixels PX, and a plurality of display pads PDD. FIG. 3 schematically illustrates an equivalent circuit diagram of one pixel PX for ease of description.

According to an embodiment, the display panel DP is divided a display region DA and a non-display region NDA. The display region DA is where the image IM (see FIG. 1) is displayed. The display panel DP activates the display region DA according to an electrical signal. The image is displayed in the activated display region DA. The transmissive region TA (see FIG. 1) overlaps the display region DA.

According to an embodiment, the non-display region NDA is adjacent to the display region DA. The non-display region NDA surrounds the edge of the display region DA. However, embodiments are not limited thereto. In other embodiments, the non-display region NDA may be adjacent to only a portion of the edge of the display region DA, and is not limited to any one embodiment.

According to an embodiment, signal lines that transmit electrical signals to the display region DA, electronic elements, or etc. are disposed in the non-display region NDA.

The non-display region NDA is covered by the bezel region BZA (see FIG. 1) and is not externally visible.

According to an embodiment, the plurality of signal lines GL, DL, and PL, the plurality of pixels PX, and the plurality of display pads PDD are disposed on the base layer BS. The signal lines GL, DL, and PL include a gate line GL, a data line DL, and a power line PL. The gate line GL, the data line DL, and the power line PL respectively transmit different electrical signals from each other.

According to an embodiment, the gate lines GL extend in the first direction DR1. There are a plurality of gate lines GL that are spaced apart from each other in the second direction DR2, although a single gate Line GL is exemplarily illustrated in FIG. 3.

In addition, according to an embodiment, the display unit DU further includes a gate driving circuit that transmits electrical signals to the gate lines GL. The gate driving circuit is disposed on the base layer BS. A gate driving circuit pad that transmits an electrical signal to the gate driving circuit is one of the display pads PDD. Alternatively, the gate driving circuit may be provided outside the display panel DP.

According to an embodiment, the data lines DL extend in the second direction DR2. The data lines DL are electrically insulated from the gate lines GL. There are a plurality of data lines DL that are spaced apart from each other in the first direction DR1, although a single data line DL is exemplarily illustrated in FIG. 3. The data lines DL are connected to a data pad that is one of the display pads PDD. The data lines DL transmit a data signal received from the data pad to the pixels.

According to an embodiment, the power lines PL extend in the second direction DR2. The power lines PL are electrically insulated from the gate lines GL and the data lines DL. There are a plurality of power lines PL that are spaced apart from each other in the first direction DR1, although a single power line PL is exemplarily illustrated in FIG. 3. The power lines PL transmit a power signal to the pixel PX.

According to an embodiment, the pixels PX are disposed in the display region DA. There are a plurality of pixels PX that are respectively connected to corresponding signal lines, although a single pixel PX is exemplarily illustrated for ease of description. The pixel PX displays an image IM by emitting light according to an electrical signal.

According to an embodiment, each pixel PX includes a first thin film transistor TR1, a second thin film transistor TR2, a capacitor CP, and a light emitting element EMD. The first thin film transistor TR1, the second thin film transistor TR2, the capacitor CP, and the light emitting element EMD are electrically connected to each other.

According to an embodiment, the first thin film transistor TR1 is a switching element that controls turn-on and turn-off of the pixel PX. The first thin film transistor TR1 is connected to the gate line GL and the data line DL. The first thin film transistor TR1 is turned on by a gate signal transmitted through the gate line GL to transmit a data signal provided through the data line DL to the capacitor CP.

According to an embodiment, the capacitor CP is charged to a voltage corresponding to a potential difference between a first power signal received from the power line PL and the signal received from the first thin film transistor TR1. The second thin film transistor TR2 transmits the first power signal received from the power line PL to the light emitting element EMD in response to the voltage to which the capacitor CP is charged.

According to an embodiment, the light, emitting element EMD generates light or controls the intensity of light depending on an electrical signal. For example, the light emitting element EMD may be an organic light emitting element, a quantum dot light emitting element, or a micro-LED element.

According to an embodiment, the light emitting element EMD is provided with a second power signal different from the power signal received from the power line PL. A driving current that corresponds to a difference between the first power signal received from the second thin film transistor TR2 and the second power signal flows to the light emitting element EMD, and the light emitting element EMD generates light corresponding to the driving current.

However, embodiments are not limited thereto, and in other embodiments, the pixel PX may include additional electronic elements in different configurations and arrangements, and is not limited to any one embodiment.

According to an embodiment, the display pads PDD are disposed in the non-display region NDA. The display pads PDD are respectively connected to the signal lines. The pixels PX are electrically connected via the display pads PDD to elements disposed outside the display panel DP.

According to an embodiment, the circuit board CB is connected to the display pads PDD. The circuit board CB transmits an electrical signal to the display panel DP via the display pads PDD. The circuit board CB generates a signal that controls an image IM or a power signal, and transmits the signal or power signal to the display panel DP. The circuit board CB includes a flexible board FPC and a driving element IC.

According to an embodiment, the flexible board FPC is electrically connected via the display pads PDD to the display panel DP. The flexible board FPC is electrically and physically coupled to the display panel DP through an adhesive member, such as an anisotropic conductive film.

According to an embodiment, the driving element IC is mounted on the flexible board FPC. The driving element IC is electrically connected via the signal lines of the flexible board FPC to the display panel DR. The driving element IC generates or processes various electrical signals.

According to an embodiment, the circuit board CB is bent toward a rear surface of the base layer BS after the circuit board CB has been coupled to the display panel DP. Accordingly, the driving element IC is not visible when viewed from a front surface of the display unit DU.

According to an embodiment, the first adhesive layer AL1 is disposed below the display panel DP. The first adhesive layer AL1 overlaps the entirety of the display region DA when viewed in a plane. For example, the first adhesive layer AL1 overlaps the entirety of the display panel DP. According to an embodiment, the phrase "when viewed in a plane" refers to a case of viewing from the third direction DR3. Further, the phrase "thickness direction" refers to the third direction DR3.

According to an embodiment, the protective film LAL is disposed below the first adhesive layer AL1. The protective film LAL overlaps the entirety of the display region DA when viewed in a plane. For example, the protective film LAL overlaps the entirety of the display panel DP. The protective film LAL is attached to the entirety of a rear surface of the display panel DP and protects the display panel DP.

According to an embodiment, the protective film LAL is a translucent layer. The protective film LAL transmits a portion of light and absorbs another portion thereof. The protective film LAL includes a colored film. For example, the colored film has a predetermined color. The color has high light absorption, that is, a color that has low light transmittance. For example, the color may be gray. The film may be, for example, a polyimide film or a polyethylene terephthalate film. The transmittance of the protective film LAL is 15% or less at 450 nm, 37% or less at 550 nm, 58% or less at 650 nm, and 65% or less at 740 nm. However, these wavelength percentage values are given as an example, and embodiments are not limited thereto. In addition, the transmittance of the protective film LAL is not 0% because foreign matter or scratches in the display panel DP cannot be inspected using a camera when the protective film LAL absorbs all light.

According to an embodiment, the second adhesive layer AL2 is disposed below the protective film LAL. The second adhesive layer AL2 overlaps the entirety of the display region DA when viewed in a plane. For example, the second adhesive layer AL2 overlaps the entirety of the display panel DP.

According to an embodiment, the cover layer CVL is disposed below the second adhesive layer AL2. The cover layer CVL absorbs external impacts to protect the display panel DP. An opening OP is provided in the cover layer CVL. The opening OP overlaps the display region DA when viewed in a plane.

According to an embodiment, the first adhesive layer AL1 is disposed between the display panel DP and the protective film LAL. The first adhesive layer AL1 is bonded to the display panel DP and the protective film LAL. The second adhesive layer AL2 is disposed between the protective film LAL and the cover layer CVL. The second adhesive layer AL2 is bonded to the protective film LAL and the cover layer CVL.

According to an embodiment, each of the first adhesive layer AL1 and the second adhesive layer AL2 includes a typical adhesive. For example, each of the first adhesive layer AL1 and the second adhesive layer AL2 may be an optically clear resin (OCR), an optically clear adhesive (OCA), or a pressure sensitive adhesive (PSA).

According to an embodiment, the fingerprint detecting unit FSU is disposed on the rear surface of the display panel DP. The fingerprint detecting unit FSU includes a fingerprint sensor FS and a detection circuit board CB-F. The detection circuit board CB-F is electrically connected to the fingerprint sensor FS.

In an embodiment of the inventive concept, the fingerprint sensor FS is an ultrasonic fingerprint sensor that detects vibration using a piezoelectric body. Because the fingerprint sensor FS is an ultrasonic fingerprint sensor, fingerprint detection sensitivity does not deteriorate even if the protective film LAL is disposed above the fingerprint sensor FS.

According to an embodiment, the adhesive member RS is disposed between the fingerprint sensor FS and the second adhesive layer AL2. The adhesive member RS and the fingerprint sensor FS are accommodated in the opening OP. The adhesive member RS attaches the fingerprint sensor FS to the second adhesive layer AL2. In other embodiments of the inventive concept, the adhesive member RS is omitted.

According to an embodiment, the adhesive member RS includes an adhesive material, and the adhesive material is a resin. The adhesive member RS can be provided in various forms. For example, the adhesive member RS can be provided in a liquid form to be cured, or can also be a sheet such as a double-sided tape.

According to an embodiment, the adhesive member RS is optically clear. The adhesive member RS includes a typical adhesive. For example, the adhesive member RS may include an optically clear resin (OCR), an optically clear adhesive (OCA), or a pressure sensitive adhesive (PSA). Alternatively, the adhesive member RS may be optically translucent or opaque.

Figure 4:
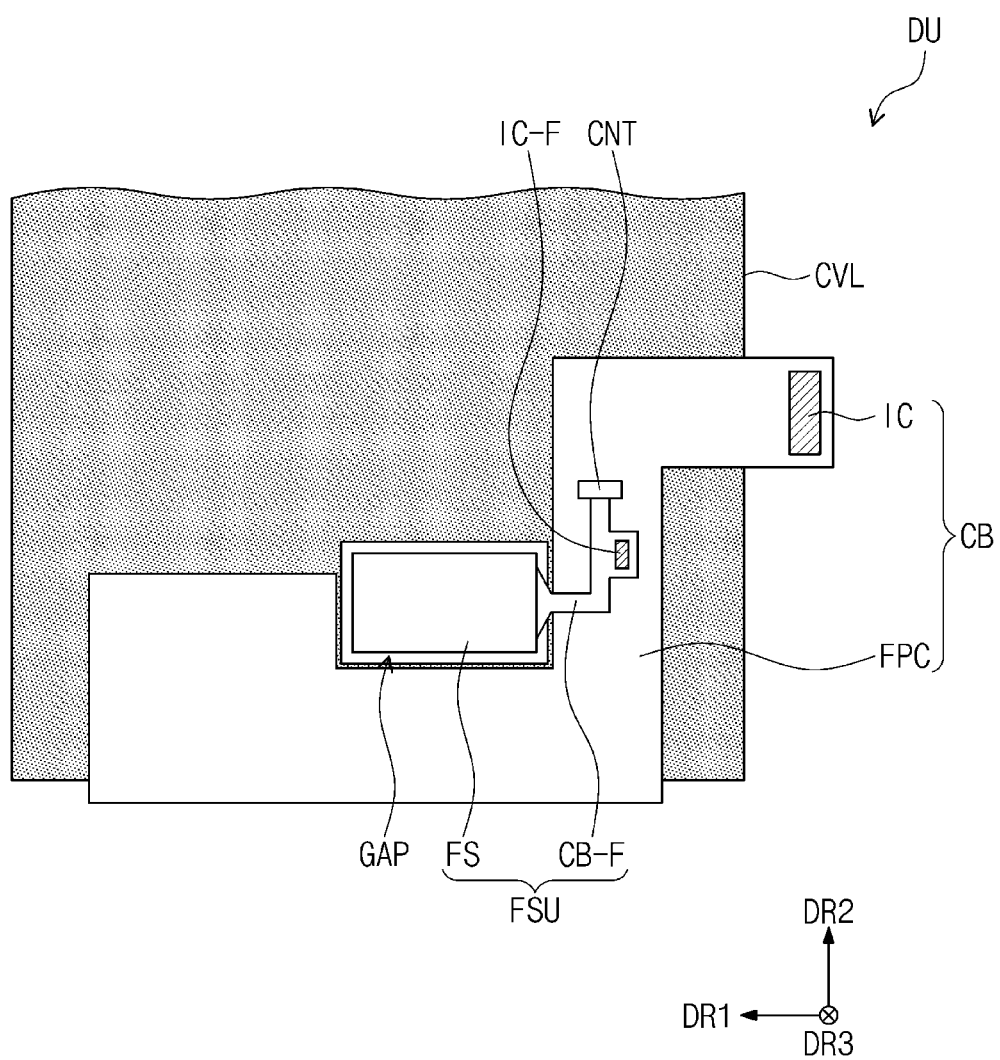
FIG. 4 is a rear view of a portion of a display device according to an embodiment of the inventive concept.
Figure 5:
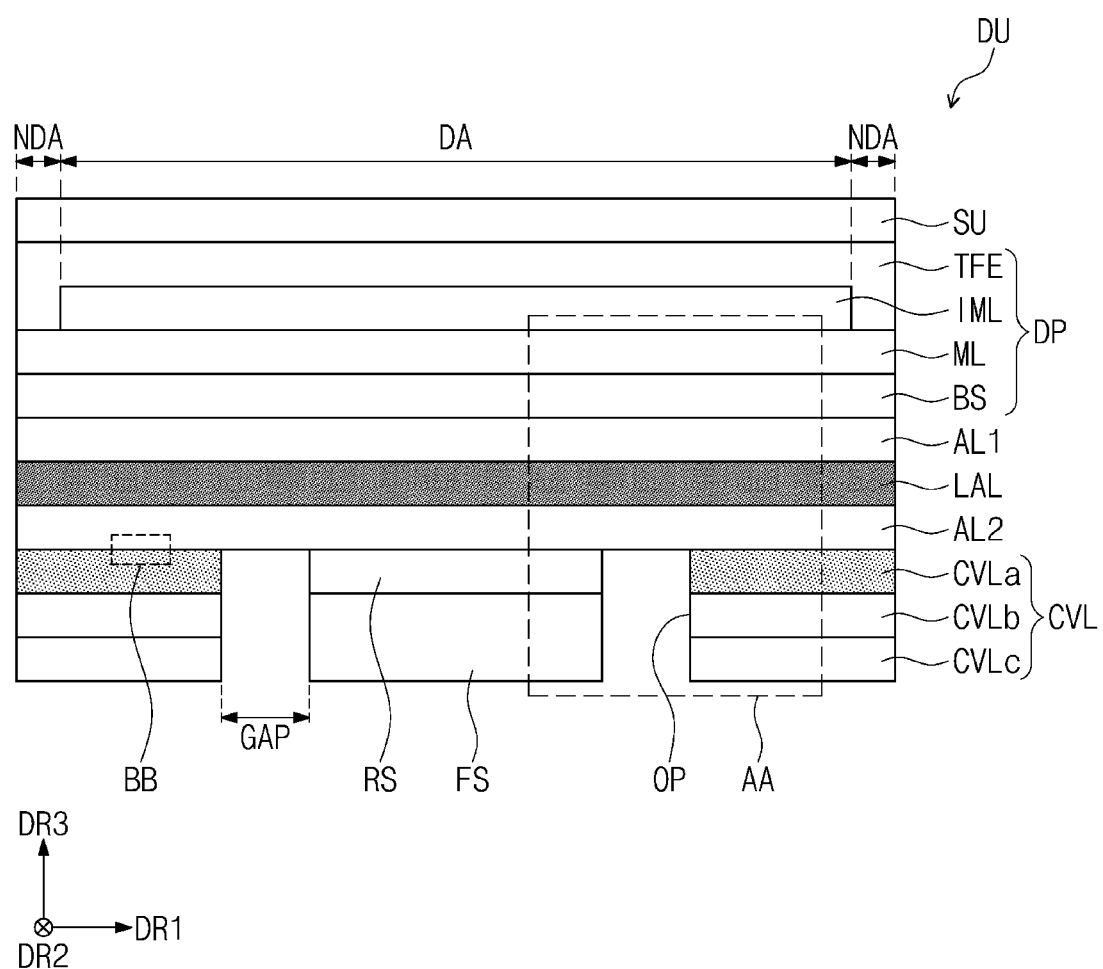
FIG. 5 is a cross-sectional view of a display unit according to an embodiment of the inventive concept.

FIG. 4 is a rear view of a portion of a display device according to an embodiment of the inventive concept. FIG. 5 is a cross-sectional view of a display unit according to an embodiment of the inventive concept. In FIGS. 4 and 5, some components are omitted.

Referring to FIGS. 4 and 5, according to an embodiment, the circuit board CB can be bent from one side of the display panel DP (see FIG. 3) to be positioned on the rear surface of the display panel DP. A portion of the circuit board CB is bent that covers a portion of a rear surface of the cover layer CVL.

According to an embodiment, the detection circuit board CB-F is electrically connected to the circuit board CB. In this embodiment, the detection circuit board CB-F is connected to the circuit board CB via a connector CNT disposed on the circuit board CB. Accordingly, the fingerprint sensor FS is electrically connected to the circuit board CB, and the fingerprint sensor FS can transmit/receive at electrical signal to/from the display panel DP. However, although a driving element IC-F is illustrated as being mounted on the detection circuit board CB-F, embodiments are not limited thereto, and the driving element IC-F can be omitted from the detection circuit board CB-F in other embodiments.

According to an embodiment, the detection circuit board CB-F is partly accommodated in the opening OP. For example, a portion of one side of the detection circuit board CB-F which is connected to the fingerprint sensor FS overlaps the opening OP when viewed in a plane. A remaining portion of the detection circuit board CB-F extends outwards from the opening OP and is connected to the circuit board CB. However, embodiments are not limited thereto, and in other embodiments, the detection circuit board CB-F may be wholly accommodated in the opening OP in the cover layer CVL, depending on the shape and the size of the detection circuit board CB-F.

According to an embodiment, the fingerprint sensor FS is accommodated in the opening OP of the cover layer CVL. The opening OP has a larger area, when viewed in a plane, than the fingerprint sensor FS so that the fingerprint sensor FS can be accommodated in the opening OP. The fingerprint sensor FS is spaced apart from the opening OP when viewed in a plane. That is, there is a gap GAP between the fingerprint sensor FS and the cover layer CVL. FIG. 4 shows the gap GAP along the edge of the fingerprint sensor FS. The gap GAP may have a constant width or a varying width along the edge of the fingerprint sensor FS, and is not limited to any one embodiment. Alternatively, there may be a gap GAP along a portion of the edge of the fingerprint sensor FS.

According to an embodiment, the gap GAP overlaps the display region DA when viewed in a plane. The protective film LAL absorbs a portion of light propagating toward the gap GAP and a portion of light reflected back toward the display panel DP after propagating through the gap GAP. The protective film LAL prevents a region adjacent to the fingerprint sensor FS and a region that overlaps the fingerprint sensor FS from appearing brighter or darker by the gap GAP than the remaining regions.

According to an embodiment, the cover layer CVL includes a first cover layer CVLa, a second cover layer CVLb, and a third cover layer CVLc. The first cover layer CVLa is disposed below the second adhesive layer AL2, and the first cover layer CVLa is attached to the second adhesive layer AL2. The second cover layer CVLb is disposed below the first cover layer CVLa. An adhesive layer is further disposed between the first cover layer CVLa and the second cover layer CVLb. The third cover layer CVLc is disposed below the second cover layer CVLb. An adhesive layer is further disposed between the second cover layer CVLb and the third cover layer CVLc.

According to an embodiment, the first cover layer CVLa is an embossed layer. The first cover layer CVLa is colored and may be, for example, black. Accordingly, the first cover layer CVLa absorbs light incident on the first cover layer CVLa.

According to an embodiment, the second cover layer CVLb is a cushion layer. The second cover layer CVLb may include a sponge, a foam, a urethane resin, or etc. The second cover layer CVLb is thicker than the first covet layer CVLa.

According to an embodiment, the third cover layer CVLc is a heat dissipation layer. The third cover layer CVLc includes a thermally conductive substance that can dissipate heat. For example, the third cover layer CVLc may be a single graphite layer or a laminate that includes a graphite layer. In addition, the third cover layer CVLc may also shield electromagnetic waves.

According to an embodiment, although FIG. 5 illustrates the cover layer CVL as including the first to third cover layers CVLa to CVLc, embodiments of the inventive concept are not limited thereto. The cover layer CVL may further include functional layers other than the above-mentioned first to third cover layers CVLa to CVLc, and at least some of the functional layers may also be omitted. Further, the stacking order of the functional layers is not limited to the above example.

According to an embodiment, the display panel DP includes the base layer BS, a circuit layer ML, a light emitting layer IML, and an encapsulation layer TFE. The circuit layer ML includes the first thin film transistor TR1, the second thin film transistor TR2, the capacitor CP, and the plurality of signal lines GL, DL, and PL described with reference to FIG. 3 above. The light emitting layer IML includes the light emitting element EMD described with reference to FIG. 3 above. The encapsulation layer TFE protects the circuit layer ML and the light emitting layer IML from foreign matter or moisture. The encapsulation layer TFE has a laminated structure that includes an inorganic encapsulation layer and an organic encapsulation layer, and also a single substrate.

According to an embodiment, the sensing unit SU is disposed directly on the encapsulation layer TFE. For example, the sensing electrode SS or the sensing lines SL1 and SL2 described with reference to FIG. 3 can be formed directly on the encapsulation layer TFE. Alternatively, the sensing unit SU may be formed separately from the display panel DP, and then be attached on the display panel DP by an adhesive layer. The sensing unit SU may be disposed on the front surface of the display panel DP or may be included inside the display panel DP. The sensing unit SU according to an embodiment of the inventive concept can be provided in various forms and is not limited to any one embodiment. Further, in other embodiments of the inventive concept, the sensing unit SU is omitted.

Figure 6A:
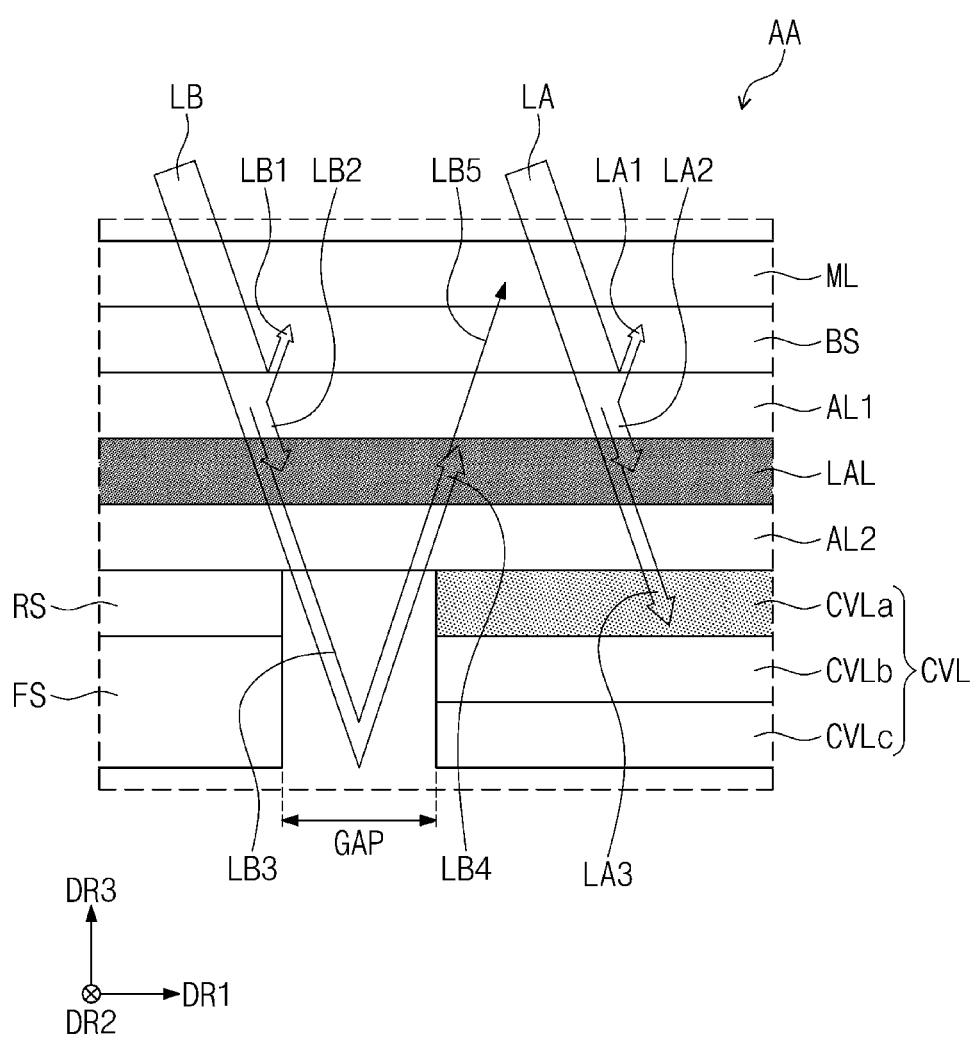
FIG. 6A is an enlarged cross-sectional view of region AA in FIG. 5.
Figure 6B:
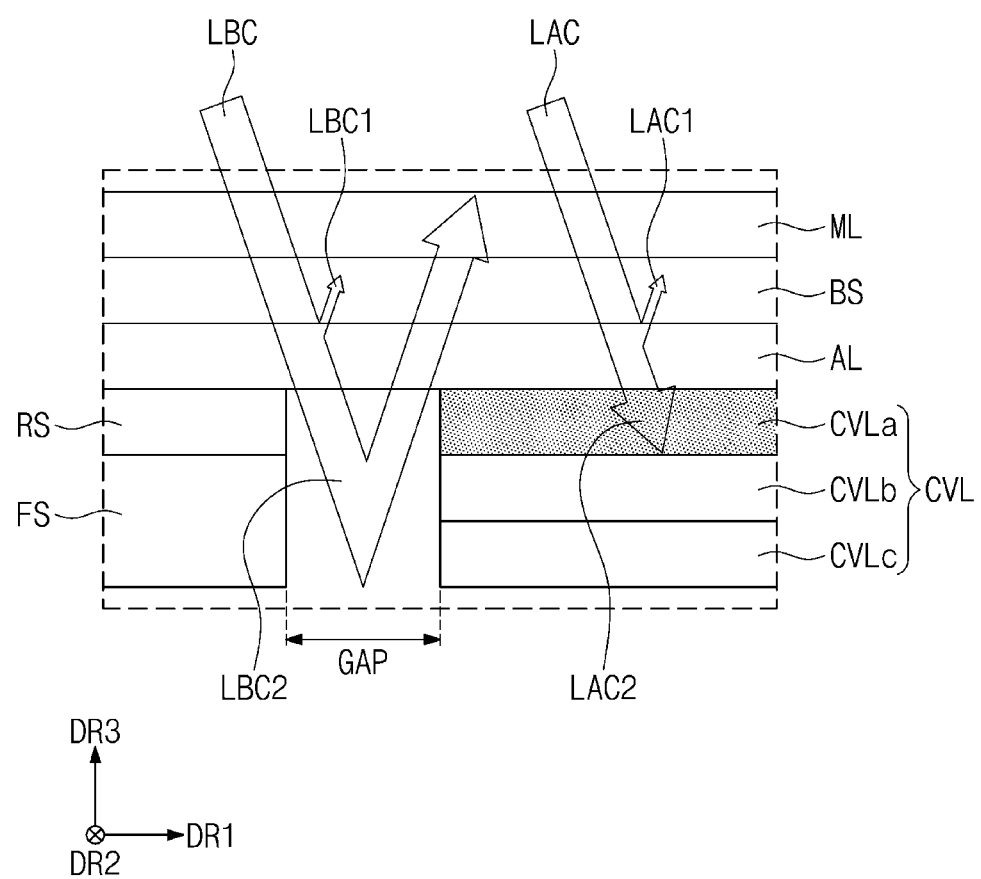
FIG. 6B is an enlarged cross-sectional view of a portion of a display device according to a comparative example of the inventive concept.

FIG. 6A is an enlarged cross-sectional view of region AA illustrated in FIG. 5. FIG. 6B is an enlarged cross-sectional view of a portion of a display device according to a comparative example of the inventive concept.

FIGS. 6A and 6B illustrate light beams LA, LB, LAC, and LBC propagating toward the rear surface of the display panel DP. FIG. 6B illustrates a structure, compared with FIG. 6A, in which the protective film LAL is omitted.

In FIGS. 6A and 6B, according to an embodiment, the thicknesses of the arrows that represent the light beams LA, LB, LAC, and LBC is a visual indication of the light intensity. For example, a first light beam LA has light intensity equal to or greater than the sum of the light intensities of a first divided light beam LA1 a second divided light beam LA2, and a third divided light beam LA3.

Referring to FIGS. 5 and 6A, according to an embodiment, the first light beam LA and a second light beam LB are propagating toward the rear surface of the display panel DP. The first light beam LA propagates toward a region that overlaps the cover layer CVL when viewed in a plane, and the second light beam LB propagates toward a region that does not overlap the cover layer CVL when viewed in a plane. For example, the second light beam LB propagates toward the gap GAP.

According to an embodiment of the inventive concept, a portion of each of the first light beam LA and the second light beam LB is refracted or reflected by a difference in refractive index between the layers. In FIG. 6A, refracted or reflected light beams are denoted by the first divided light beam LA1 and a first divided light beam LB1. The first divided light beams LA1 and LB1 are refracted or reflected to propagate toward the display panel DP. The first divided light beams LA1 and LB1 propagate toward the display panel DP in a region that overlaps the cover layer CVL and a region that does not overlap the cover layer CVL. Accordingly, a phenomenon in which a region that overlaps the fingerprint sensor FS and a region adjacent to the fingerprint sensor FS appears brighter or darker is not caused by the first divided light beams LA1 and LB1.

According to an embodiment of the inventive concept, a portion of each of the first light beam LA and the second light beam LB is absorbed by the protective film LAL. In FIG. 6A, light beams absorbed by the protective film LAL are denoted by the second divided light beams LA2 and LB2. In FIG. 6A, light beams that propagate through the protective film LAL are denoted by the third divided light beams LA3 and LB3. Accordingly, the third divided light beams LA3 and LB3 propagate through the protective film LAL.

According to an embodiment, the third divided light beam LA3 of the first light beam LA is absorbed by the first cover layer CVLa. The third divided light brain LB3 of the second light beam LB is reflected by components below the second adhesive layer AL2, such as the bracket BRK (see FIG. 2), the fingerprint sensor FS, the detection circuit board CB-F, or etc, and the reflected portion, denoted by the fourth divided light beam LB4, propagates back toward the display panel DP. A portion of the fourth divided light beam LB4 is absorbed while propagating through the protective film LAL, and a remaining fifth divided light beam LB5 propagates toward the display panel DP.

Referring to FIG. 6B, according to a comparative example of the inventive concept, a first divided light beam LAC1 of a first light beam LAC and a first divided light beam LBC1 of a second light beam LBC are refracted or reflected to propagate back toward a top surface of the display panel DP. A second divided light beam LAC2 of the first light beam LAC is absorbed by a first cover layer CVLa. However, a second divided light bean a LBC2 of the second light beam LBC is reflected by components below an adhesive layer AL and propagates back toward the display panel DP.

The light intensity of the fifth divided light beam LB5 according to an embodiment of the inventive concept differs from the light intensity of the second divided light beam LBC2 according to a comparative example of the inventive concept. The light intensity of the second divided light beam LBC2 is greater than the light intensity of the fifth divided light beam LB5.

According to a comparative example of the inventive concept, a phenomenon occurs in which a peripheral region of a fingerprint sensor FS appears to be brighter or darker due to the second divided light beam LBC2. For example, when the display panel DP is driven at a low gradation level, the second divided light beam LBC2 can be perceived by a user, and thus a phenomenon occurs in which the peripheral region of the fingerprint sensor FS appears brighter. In addition, when the display panel DP is driven at a high gradation level, a photoelectric phenomenon of thin film transistors disposed in a circuit layer ML occurs due to the second divided light beam LBC2, in which the peripheral region of the fingerprint sensor FS appears to be darker. In this specification, the phrase "peripheral region" is used to include both a region that overlaps the fingerprint sensor FS and a region adjacent to the fingerprint sensor FS, when viewed in a plane.

However, according to an embodiment of the inventive concept, the fifth divided light beam LB5 that propagates back toward the display panel DP has passed through the protective film LAL at least twice. Accordingly, the light intensity of the fifth divided light beam LB5 is insufficient to brighten or darken the region adjacent to the fingerprint sensor FS. Accordingly, the difference between the luminance of a peripheral region of the fingerprint sensor FS and the luminance of a remaining region is minimized, and thus the display characteristic of the display panel DP is improved.

Figure 7:
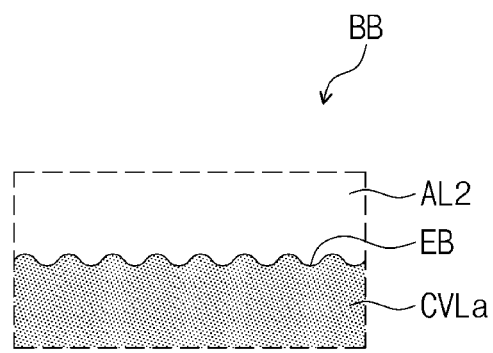
FIG. 7 is an enlarged cross-sectional view of region BB in FIG. 5.

FIG. 7 is an enlarged cross-sectional view of region BB illustrated in FIG. 5.

Referring to FIG. 7, according to an embodiment, the first cover layer CVLa includes a fine undulation EB. The undulation EB is provided in a surface where the first cover layer CVLa is attached to the second adhesive layer AL2. In other words, the first cover layer CVLa includes an undulating surface. The undulation EB prevents uneven bubbles from being formed between the second adhesive layer AL2 and the first cover layer CVLa, and improves the adhesive force between the second adhesive layer AL2 and the first cover layer CVLa.

Figure 8:
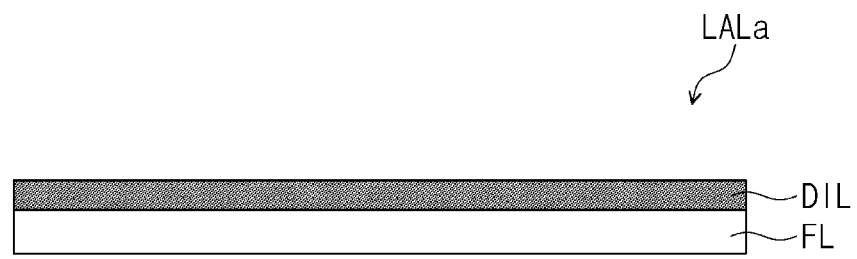
FIG. 8 is a cross-sectional view of a protective film according to an embodiment of the inventive concept.

FIG. 8 is a cross-sectional view of a protective film according to an embodiment of the inventive concept.

Referring to FIG. 8, according to an embodiment, a protective film LALa includes a base film FL and a colored layer DIL. The base film FL may be a polyimide film or a polyterephthalate film. However, this is an example, and embodiments are not limited thereto.

According to an embodiment, the base film FL is a light transmitting film. However, embodiments of the inventive concept are not limited thereto, and the base film FL may be a colored film in other embodiments.

According to an embodiment, the colored layer DIL is disposed on the base film FL. The colored layer DIL has a predetermined color. For example, the colored layer DIL is a color printed layer. The color may be gray.

According to an embodiment, the protective film LALa may be substituted for the protective film LAL illustrated in FIG. 5. For example, the colored layer DIL can be attached to the first adhesive layer AL1 (see FIG. 5), and the base film FL can be attached to the second adhesive layer AL2 (see FIG. 5).

Figure 9:
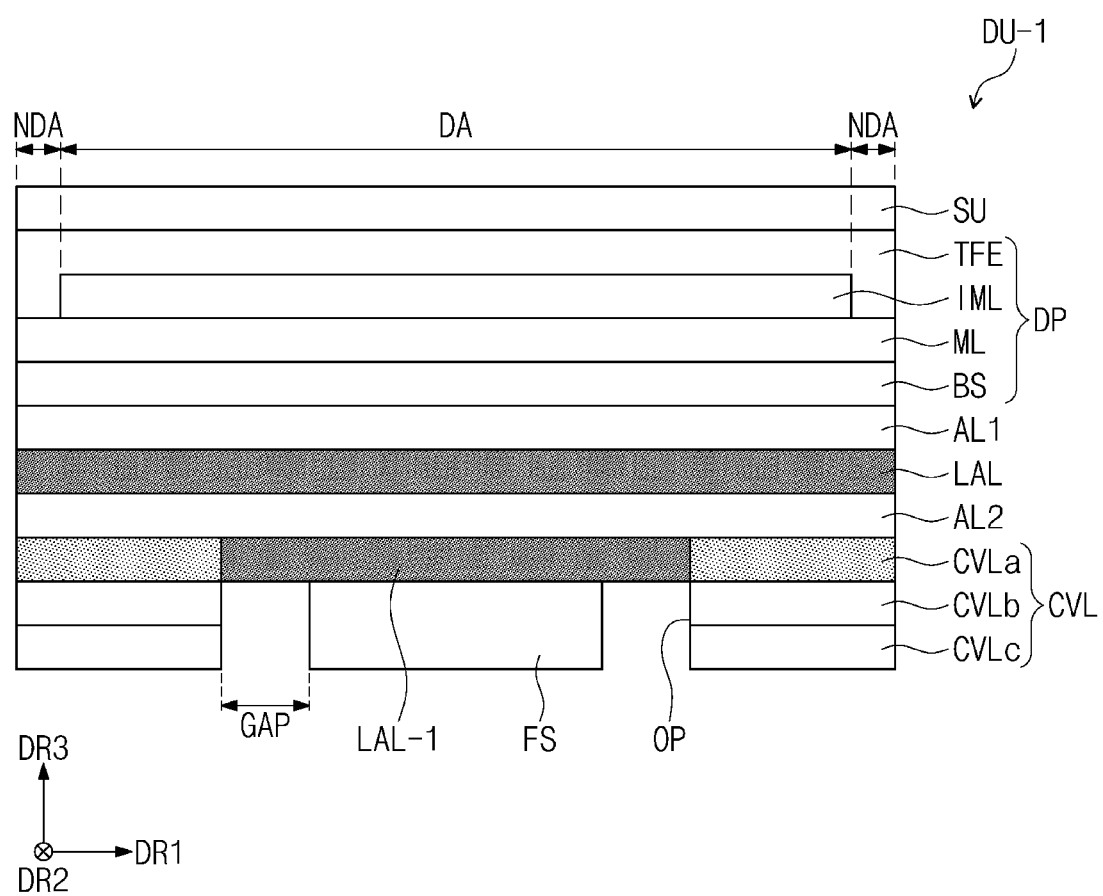
FIG. 9 is a cross-sectional view of a display unit according to an embodiment of the inventive concept.

FIG. 9 is a cross-sectional view of a display unit according to an embodiment of the inventive concept.

Referring to FIG. 9, according to an embodiment, an adhesive member LAL-1 of a display unit DU-1 is accommodated in the opening OP. The adhesive member LAL-1 attaches the fingerprint sensor FS to the second adhesive layer AL2. The adhesive member LAL-1 corresponds to the size of the opening OP. Accordingly, the entirety of the opening OP completely overlaps the adhesive member LAL-1 when viewed in a plane.

In an embodiment of the inventive concept, at least one of the adhesive member LAL-1 or the protective film LAL is translucent or opaque. For example, the adhesive member LAL-1 is a translucent or opaque resin, and the protective film LAL transparent. The term "translucent" means that a portion of light is absorbed and another portion of the light passes through, and the term "opaque" means that all light is absorbed.

According to an embodiment of the inventive concept, the adhesive member LAL-1 is a translucent or opaque resin, and the protective film LAL is translucent. In this case, light incident through the gap GAP is absorbed not only by the protective film LAL but also by the adhesive member LAL-1. Accordingly, the intensity of light re-incident on the display panel DP can be further reduced.

Figure 10:
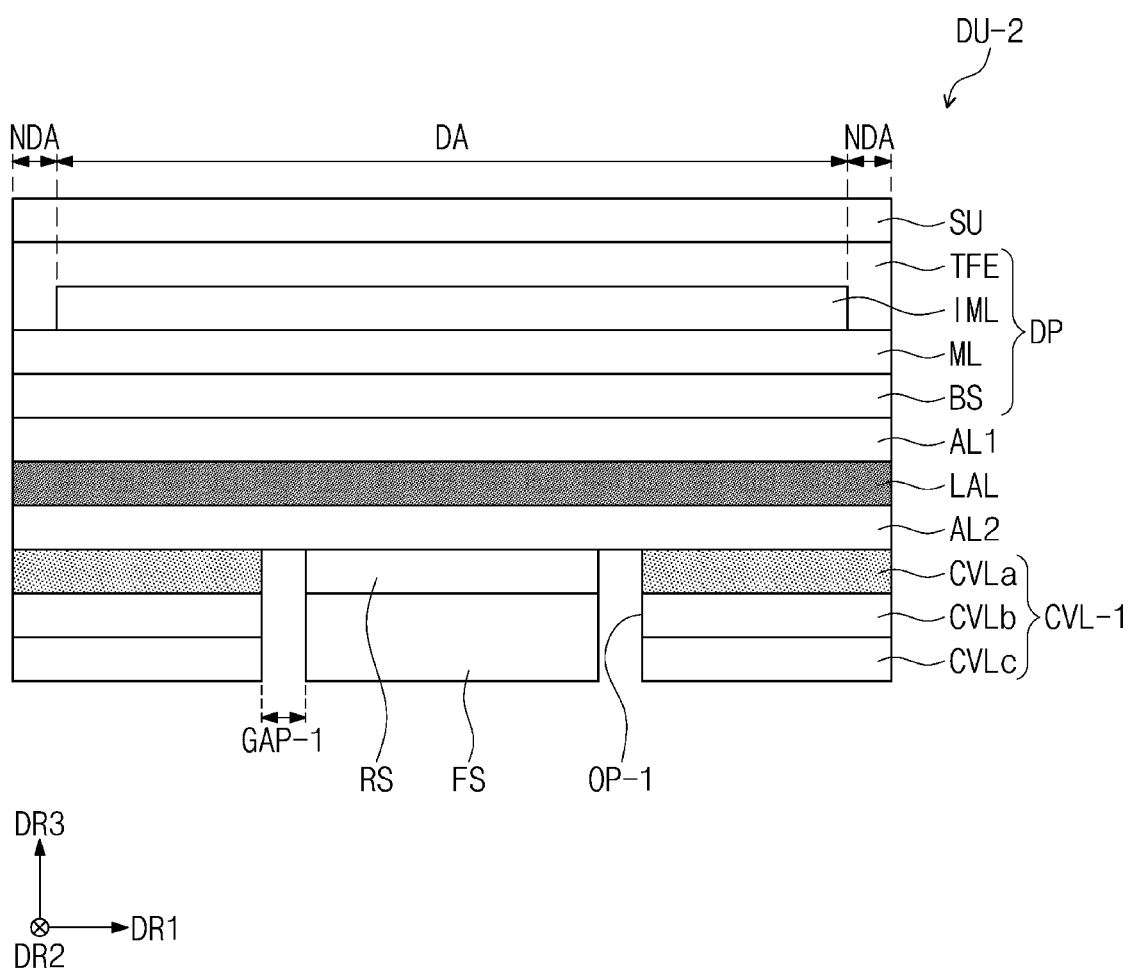
FIG. 10 is a cross-sectional view of a display unit according to an embodiment of the inventive concept.

FIG. 10 is a cross-sectional view of a display unit according to an embodiment of the inventive concept.

Referring to FIG. 10 according to an embodiment, a display unit DU-2 includes cover layer CVL-1.

According to an embodiment, an opening OP-1 is provided in the cover layer CVL-1. The opening OP-1 of the cover layer CVL-1 is smaller than the opening OP of the cover layer CVL illustrated in FIG. 5. That is, a gap GAP-1 between the fingerprint sensor FS and the cover layer CVL-1 is further reduced. As a result, the intensity of light reflected back to the display panel DP after propagating through the gap GAP-1 is reduced. The gap GAP-1 ranges from about 0 mm to about 5 mm in width, such as from 0 mm to 3 mm inclusive. The smaller the gap GAP-1 is, the greater is the reduction of light intensity reflected back to the display panel after propagating through the gap GAP-1.

Figure 11:
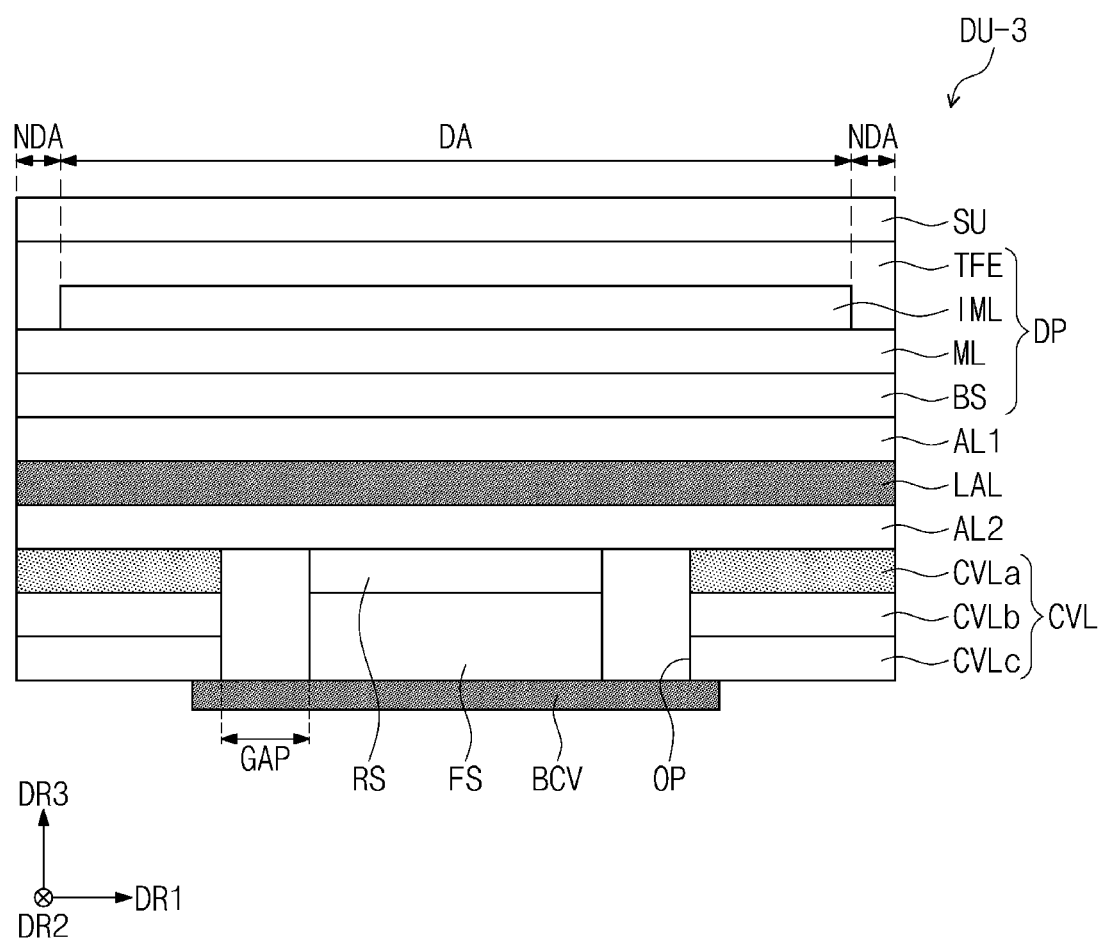
FIG. 11 is a cross-sectional view of a display unit according to an embodiment of the inventive concept.

FIG. 11 is a cross-sectional view of a display unit according to an embodiment of the inventive concept.

Referring to FIG. 11, according to an embodiment, a display unit DU-3 includes a light absorbing member BCV. The light absorbing member BCV is disposed below the cover layer CVL, and entirely covers the opening OP. The light absorbing member BCV overlaps the entirety of the opening OP and a portion of the display region DA, when viewed in a plane.

According to an embodiment, the light absorbing member BCV has a predetermined color. For example, the color may be gray or black. When the light absorbing member BCV is black, the light absorbing member BCV absorbs all light that is incident on the light absorbing member BCV. The light absorbing member BCV can be incorporated into the display units DU, DU-1 and DU-2 described with reference to FIGS. 5, 9 and 10.

Figure 12:
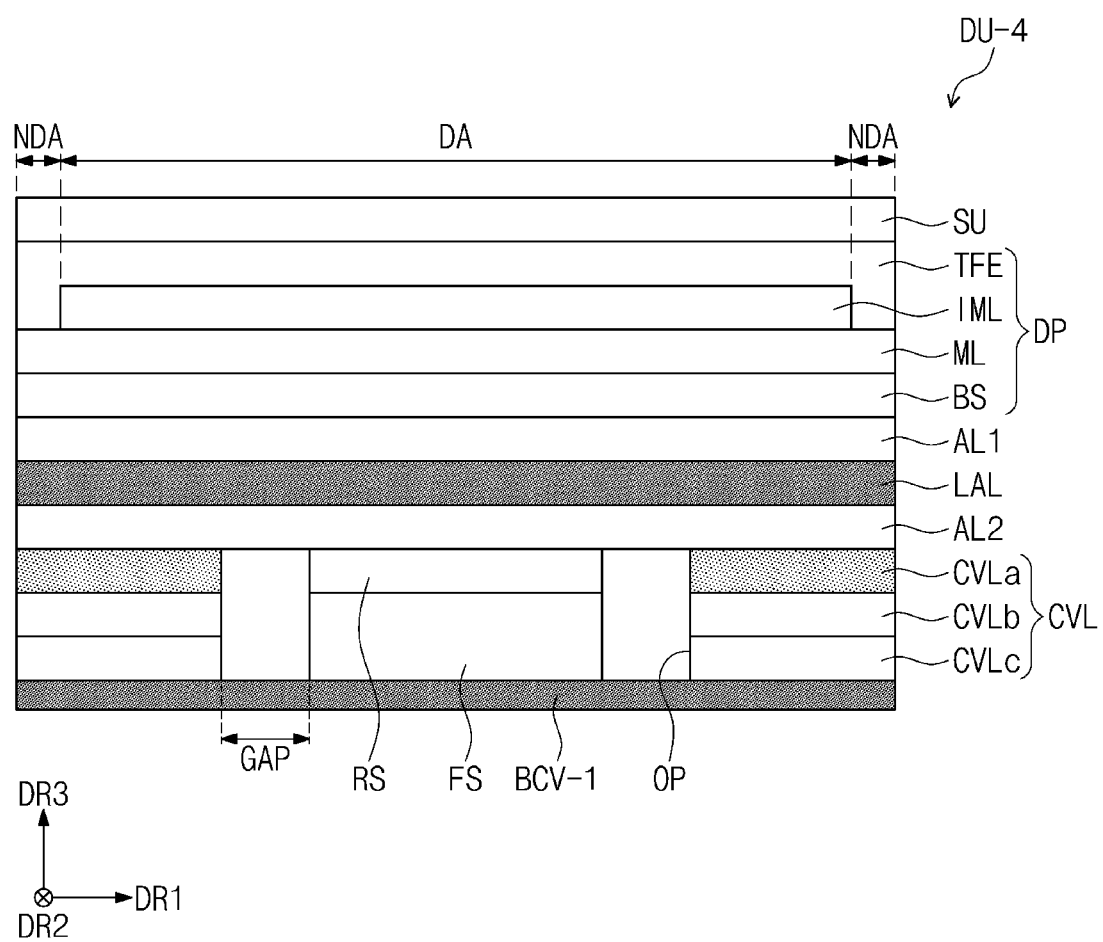
FIG. 12 is a cross-sectional view of a display unit according to an embodiment of the inventive concept.

FIG. 12 is a cross-sectional view of a display unit according to an embodiment of the inventive concept.

Referring to FIG. 12, according to an embodiment, a display unit DU-4 includes a light absorbing member BCV-1. The light absorbing member BCV-1 differs in size from the light absorbing member BCV of FIG. 12. For example, the light absorbing member BCV-1 overlaps the entirety of the opening OP and the entirety of the display region DA, when viewed in a plane. The light absorbing member BCV-1 can be incorporated into the display units DU, DU-1 and DU-2 described with reference to FIGS. 5, 9 and 10.

Figure 13:
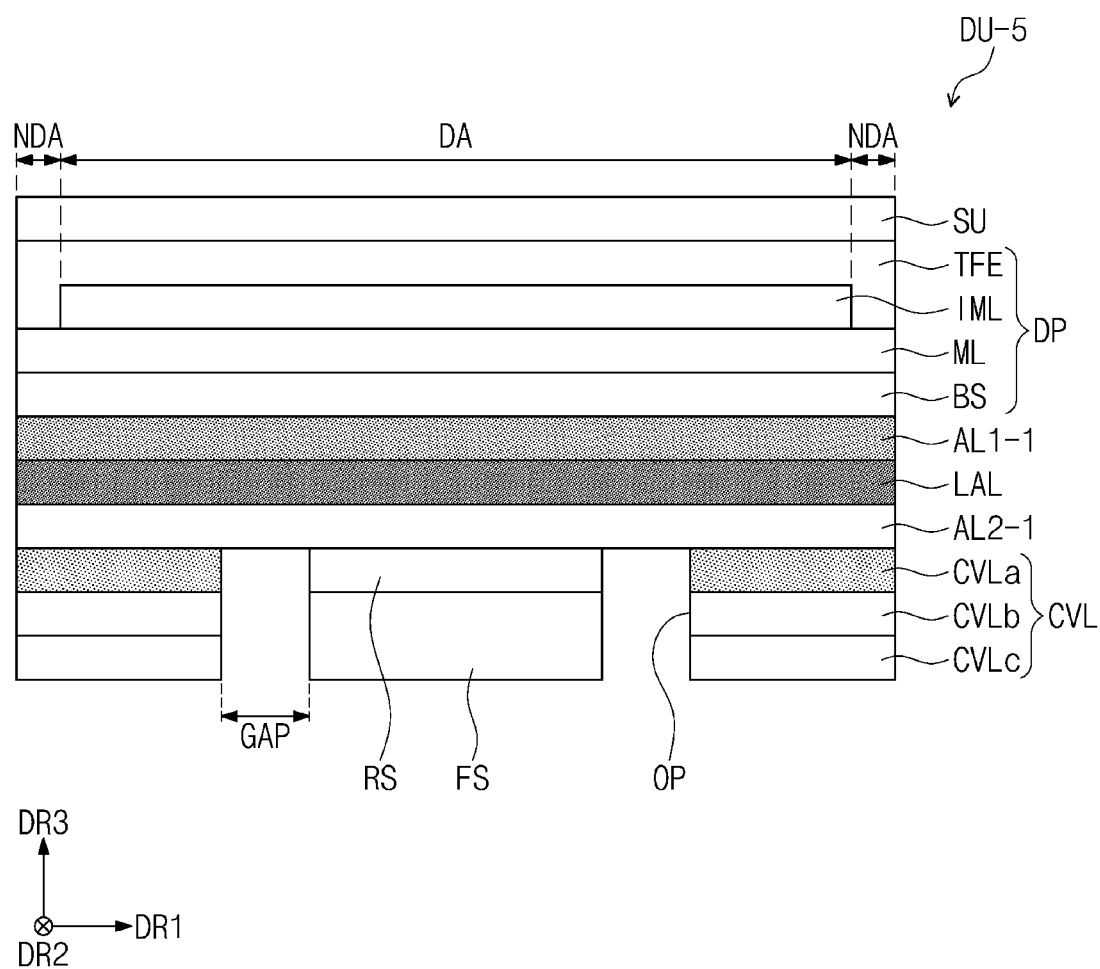
FIG. 13 is a cross-sectional view of a display unit according to an embodiment of the inventive concept.

FIG. 13 is a cross-sectional view of a display unit according to an embodiment of the inventive concept.

Referring to FIG. 13, according to an embodiment, at least one of a first adhesive layer AL1-1 or a second adhesive layer AL2-1 of a display unit DU-5 is translucent. For example, FIG. 13 illustrates the first adhesive layer AL1-1 as being translucent and the second adhesive layer AL2-1 as being transparent. However, embodiments of the inventive concept are not limited thereto. For example, in other embodiments, the first adhesive layer AL1-1 may be transparent and the second adhesive layer AL2-1 may be translucent, or both the first adhesive layer AL1-1 and the second adhesive layer AL2-1 may be translucent.

According to an embodiment, at least one of the first adhesive layer AL1-1 or the second adhesive layer AL2-1 includes a light absorbing substance. The light absorbing substance may be a colored dye such as a black dye.

According to embodiments, any of the configurations of the first adhesive layer AL1-1 and the second adhesive layer AL2-1 of display unit DU-5 as described with reference to FIG. 13 can be incorporated into any of the display units DU, DU-1, DU-2, DU-3 or DU-4 of FIGS. 5 and 9-12. In addition, the light absorbing members BCV or BCV-1 of FIGS. 11 and 12 can be incorporated into the display unit DU-5 of FIG. 13.

According to embodiment of the inventive concept, light propagating through the gap GAP is absorbed not only by the protective film LAL but also by at least one of the first adhesive layer AL1-1 or the second adhesive layer AL2-1. Accordingly, light intensity re-incident on the display panel DP is reduced. As a result, a phenomenon in which a region adjacent to the fingerprint sensor FS appears brighter or darker than a remaining region can be mitigated.

According to an embodiment of the inventive concept, a phenomenon in which a region that overlaps the fingerprint sensor and a region adjacent to the fingerprint sensor appears brighter or darker than a remaining region is mitigated by the protective film. Accordingly, the display characteristics of the display device can be improved.

Although the exemplary embodiments of the inventive concept have been described herein, it is understood that various changes and modifications can be made by those skilled in the art within the spirit and scope of embodiments of the inventive concept defined by the following claims or the equivalents. Therefore, the scope of embodiments of the inventive concept is defined by the following claims or the equivalents other than the foregoing detailed description.

What is claimed is:

1. A display device, comprising:
a display panel that includes a display region in which an image is displayed;
lower layers disposed under the display panel and that include a first adhesive layer attached to the display panel, and a protective film attached to the first adhesive layer;
cover layers disposed under the lower layers and having an opening defined therein;
a sensor inserted into the opening of the cover layers and spaced apart from a sidewall defining the opening; and
a light absorbing member disposed under the cover layers and covering the opening.

2. The display device of claim 1, wherein a gap is defined between the sensor and the opening, and the gap entirely overlaps the light absorbing member when viewed in a plan view.

3. The display device of claim 1, wherein the light absorbing member overlaps an entire area of the opening and a portion of the display panel.

4. The display device of claim 1, wherein the lower layers further comprise a second adhesive layer disposed between the protective film and the cover layers and attached to the protective film,
wherein the first adhesive layer and the protective film overlap an entire area of the display region of the display panel.

5. The display device of claim 1, wherein the protective film is translucent.

6. The display device of claim 1, wherein the protective film comprises a colored film.

7. The display device of claim 1, wherein the protective film comprises a base film and a colored layer disposed on the base film.

8. The display device of claim 1, wherein the sensor overlaps the display region when viewed a plan view.

9. The display device of claim 1, wherein the opening is defined in an area overlapping the display region.

10. The display device of claim 1, further comprising an adhesive member disposed between the sensor and the lower layers, wherein the adhesive member is accommodated in the opening.

11. The display device of claim 10, wherein the adhesive member is spaced apart from the sidewall defining the opening.

12. The display device of claim 10, wherein the adhesive member is opaque or translucent.

13. The display device of claim 1, wherein an area of the opening is smaller than an area of the light absorbing member when viewed a plan view.

14. The display device of claim 1, wherein the sensor is an ultrasonic fingerprint sensor.

15. A display device, comprising:
a display panel;
lower layers disposed under the display panel;
cover layers disposed under the lower layers and that includes an opening defined therein;
a sensor inserted into the opening of the cover layers and spaced apart from a sidewall that defines the opening; and
a light absorbing member disposed under the cover layers and that covers the opening,
wherein the cover layers include a first cover layer disposed under the lower layers, a second cover layer disposed under the first cover layer, and a third cover layer disposed under the second cover layer.

16. The display device of claim 15, wherein the first cover layer includes an undulating surface, the second cover layer is a cushion layer and the third cover layer is a heat dissipation layer.

17. A display device, comprising:
a display panel;
a first adhesive layer disposed under the display panel and attached to the display panel;
a protective film disposed under the first adhesive layer and attached to the first adhesive layer;
cover layers disposed under the protective film, and having an opening defined therein;
a sensor inserted into the opening of the cover layers and spaced apart from the opening; and
a light absorbing member disposed under the cover layers and covering a gap between the sensor and a side wall defining the opening,
wherein the protective film comprises a colored film.

18. The display device of claim 17, further comprising a second adhesive layer disposed between the protective film and the cover layers and attached to the protective film.

19. The display device of claim 17, wherein the first adhesive layer and the protective film overlap an entire area of a display region of the display panel.

\* \* \* \* \*